United States Patent
Jaquette

(10) Patent No.: US 12,323,517 B2
(45) Date of Patent: Jun. 3, 2025

(54) CRYPTO-ERASURE OF DATA STORED IN A KEY PER IO-ENABLED DEVICE VIA INTERNAL ACTION

(71) Applicant: International Business Machines Corporation, Armonk, NY (US)

(72) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 17/122,956

(22) Filed: Dec. 15, 2020

(65) Prior Publication Data

US 2022/0191019 A1    Jun. 16, 2022

(51) Int. Cl.
*H04L 9/08* (2006.01)

(52) U.S. Cl.
CPC .......... *H04L 9/0891* (2013.01); *H04L 9/0819* (2013.01); *H04L 9/0861* (2013.01); *H04L 9/0894* (2013.01)

(58) Field of Classification Search
CPC ... H04L 9/0891; H04L 9/0819; H04L 9/0861; H04L 9/0894
USPC ........................................................ 380/283
See application file for complete search history.

(56) References Cited

U.S. PATENT DOCUMENTS

| | | | |
|---|---|---|---|
| 5,940,507 A | 8/1999 | Cane et al. | |
| 6,363,480 B1 | 3/2002 | Perlman | |
| 9,258,120 B1 | 2/2016 | Allen | |
| 9,455,963 B1 | 9/2016 | Roth et al. | |
| 9,594,698 B2 * | 3/2017 | Koning | H04L 9/0894 |
| 9,720,700 B1 | 8/2017 | Brown et al. | |
| 9,948,615 B1 | 4/2018 | Davis | |
| 10,205,594 B1 * | 2/2019 | Kaufman | H04L 9/0822 |
| 10,491,576 B1 | 11/2019 | Pfannenschmidt et al. | |
| 2008/0141039 A1 | 6/2008 | Matze | |
| 2009/0245522 A1 | 10/2009 | Kudo et al. | |
| 2013/0010966 A1 | 1/2013 | Li et al. | |
| 2013/0173853 A1 | 7/2013 | Ungureanu et al. | |

(Continued)

FOREIGN PATENT DOCUMENTS

| | | |
|---|---|---|
| JP | 2000341263 A | 12/2000 |
| JP | 2004343260 A | 12/2004 |

(Continued)

OTHER PUBLICATIONS

International Search Report and Written Opinion from PCT Application No. PCT/CN2021/130623, dated Feb. 10, 2022.

(Continued)

*Primary Examiner* — Linglan Edwards
*Assistant Examiner* — Phuc Pham
(74) *Attorney, Agent, or Firm* — Zilka-Kotab, P.C.

(57) ABSTRACT

Device-implemented methodology for enabling and/or performing crypto-erase via internal action and/or external action in a Key per IO-enabled system. In various approaches, crypto-erasure of the data stored in a Key per IO scheme is enabled by implementing an internal key, which is combined with an external key to generate a media encryption key, which is in turn used to encrypt/decrypt data. By restricting access to the internal key, destruction of the internal key and all media encryption key(s) created using the internal key, renders the data crypto-erased, and thus unrecoverable.

20 Claims, 8 Drawing Sheets

(56) References Cited

U.S. PATENT DOCUMENTS

| | | | |
|---|---|---|---|
| 2015/0127946 A1* | 5/2015 | Miller | H04L 9/0897 713/171 |
| 2015/0242657 A1 | 8/2015 | Kim | |
| 2019/0266103 A1 | 8/2019 | Pearson et al. | |
| 2020/0076583 A1 | 3/2020 | Furukawa | |
| 2021/0034791 A1* | 2/2021 | Singh | H04L 9/0894 |

FOREIGN PATENT DOCUMENTS

| | | |
|---|---|---|
| JP | 2004355268 A | 12/2004 |
| JP | 2006180560 A | 7/2006 |
| JP | 2008052704 A | 3/2008 |
| JP | 2008259069 A | 10/2008 |
| WO | 2018194634 A1 | 10/2018 |
| WO | 2019180521 A1 | 9/2019 |
| WO | 2021048708 A1 | 3/2021 |

OTHER PUBLICATIONS

Dell Inc., "Dell EMC Unity: Data at Rest Encryption, A Detailed Review," Dell EMC, Jul. 2017, White Paper, 15 pages.

Balasubramian et al., "Key Per IO Security Subsystem Class for NVM Express Storage Devices," USENIX Vault 20, Feb. 25, 2020, 4 pages, retrieved from https://www.usenix.org/conference/vault20/presentation/balasubramanian.

Knight et al., "TCG SSC: Key Per IO," USENIX Vault '20 presentation, Feb. 2020, 24 pages, retrieved from https://www.usenix.org/sites/default/files/conference/protected-files/vault20_slides_balasubramanian_0.pdf.

Jaquette et al., U.S. Appl. No. 62/900,045, filed Sep. 13, 2019.

Jaquette et al., U.S. Appl. No. 16/808,174, filed Mar. 3, 2020.

Seagate, "Seagate Secure TCG Enterprise SSC Self-Encrypting Drives FIPS 140 Module Security Policy," Seagate Technology, Security Level 2, Rev 2.11, May 27, 2019, 29 pages.

Kissel et al., "Guidelines for Media Sanitization," NIST Special Publication 800-88, Revision 1, Dec. 2014, 64 pages.

Perlman, R., "The Ephemerizer: Making Data Disappear," Sun Microsystems, SMLI TR-2005-140, Feb. 2005, 20 pages.

TCG, "TCG Storage Security Subsystem Class: Enterprise," TCG, Specification Version 1.00 Final, Revision 3.00, Jan. 10, 2011, 90 pages.

Wikipedia, "Secret sharing," Wikipedia, last edited Feb. 2020, 8 pages, retrieved from https://en.wikipedia.org/wiki/Secret_sharing.

Tate et al., "Implementing the Storwize V7000 and the IBM System Storage SAN32B-E4 Encryption Switch," IBM Redbooks, specifically chapters 3 and 4, Feb. 2012, 262 pages.

Japan Patent Office, "Notice of Reasons for Refusal" Mar. 10, 2025, 09 Pages, JP Application No. 2023-536569.

* cited by examiner

| Case of concern | Encryption enabled at system level? | What to do first? | First operation successful? | Result | What to do second? | Second operation successful? |
|---|---|---|---|---|---|---|
| Marginal Drive being removed (Key Per IO without invention) | Yes | Erase all ciphertext | No | Crypto-erase the data by erasing Kexts is the only option to reuse drive | Attempt to have the host crypto-erase the ciphertext on the drive by deleting all Key Per IO keys used on the failed drive. If that is not possible, then destroy the drive, it cannot be reused or returned. | If crypto-erase of host keys is possible and performed, then data has been sanitized, send drive to retirer. |
| Marginal Drive being removed (Key Per IO without invention) | Yes | Erase all ciphertext | Yes | Data has been wiped, send drive to retirer | n/a | n/a |
| Marginal Drive being removed (Key Per IO with aspects of invention) | Yes | Crypto-erase by destroying Kint | No | Treat as failed drive | Attempt to erase all ciphertext (as above), or alternately, have the host crypto-erase the ciphertext on the drive by deleting all Key Per IO keys used on the failed drive. If neither is possible, then destroy the drive, it cannot be reused or returned. | If all ciphertext was successfully erased, or if all of the Kexts used to encrypt data on the marginal drive have been erased, the drive has been sanitized, send to retirer. |
| Marginal Drive being removed (Key Per IO with aspects of invention) | Yes | Crypto-erase by destroying Kint | Yes | Send drive to retirer | n/a | n/a |

FIG. 8

CRYPTO-ERASURE OF DATA STORED IN A KEY PER IO-ENABLED DEVICE VIA INTERNAL ACTION

BACKGROUND

The present invention relates to crypto-erasure, and more specifically, this invention relates to the techniques and systems for enabling crypto-erasure via internal action in Key per IO-enabled devices.

The term "crypto-erase" generally refers to disabling access to the encryption key needed to unencrypt data in some way. This can be done, e.g., by erasing all copies of the encryption key, removing a portion of the encryption key, disabling access to an associated key required to generate or unwrap the encryption key, etc. By permanently disabling the encryption key, the data encrypted with that encryption key cannot be decrypted; the encrypted data is effectively rendered unencryptable.

It has been stipulated that today's data centers have a major problem with inability to definitively crypto-erase all failed or decommissioned Encryption-Capable Drives (ECDs). ECDs are encryption-capable whether they are of the self-encrypting drive (SED) type, and regardless of the storage technology, e.g. SSDs, HDDs, hybrid drives comprised of both solid-state and hard-disk technology, or alternative technology drives. For example, it is possible that a ECD would fail in way that it can no longer communicate to the system it is in. In such a failed state, the ECD cannot receive a command to crypto-erase or respond to such a command with a status indicating that the command to crypto-erase completed successfully. For a data center that is not willing to risk data being forensically recovered from the solid-state drive (SSD) or hard disk drive (HDD) memory of the failed ECD which could not be definitively crypto-erased, this is a problem. Today, these data centers typically resort to physically destroying those drives in an effort to prevent forensic recovery. The user cannot, in good conscience, return those drives to the manufacturer or reuse them, for fear of disclosing data.

Note that the Media Encryption Key (MEK) used to encrypt and decrypt data on a ECD is not stored in modern-day SED drives in cleartext. The MEK is instead cryptographically wrapped, e.g., itself encrypted or otherwise obfuscated. There is a field of thought that in the very long run this might not be strong enough, that the key wrapping technique might be broken in the foreseeable future (e.g. via quantum computing).

Regardless of the scope of the problem or whether there should be any valid concern that the wrapped key could be decrypted or deciphered, it may very well be true that there are entities who do not want to rely on, or fully trust, the drive to handle non-volatile storage of, and crypto-erasure of, the MEK. Such a user might greatly prefer serving the MEK to the drive after each power up cycle, rather than having the MEK stored on the ECD, to assure that the MEK can be destroyed and all the ciphertext created with it crypto-erased externally. This puts the external entity in control of the MEK, external to the ECD, and said external entity doesn't have to assure that something extraordinary must be done in the case of an ECD failing in a way which does not allow crypto-erase to be performed by the drive. Because the MEK is only stored non-volatilely external to the drive, it can potentially be destroyed by the user, independent of how the ECD failed. However, a breach of the user's key store where the MEK is kept, or eavesdropping on (and breaking any security around) communication of that MEK to the ECD renders the MEK vulnerable to capture or retrieval.

One way of enabling the ability to crypto-erase a ECD externally is by use of the direct key serving model used by LTO-4 (the first encryption-capable LTO tape drive generation). Note that how the keys are handled external to the encryption-capable device determines if they are crypto-erasable or not. But certainly, if an entity's key management is done properly, external to the ECD, then it should be possible to definitively crypto-erase all copies of the MEK associated with a failed ECD drive. However, copies of the key are typically made and stored in distributed locations to ensure the key remains available to decrypt data, because if no copy of the key remains, the data encrypted under that key, i.e., the ciphertext, will not be decryptable, and thus effectively rendered inaccessible, or "crypto-erased." Thus, key management becomes significantly more difficult to secure as more and more copies of the key are made for resiliency, external to the ECD.

Subsequent to the time of LTO-4, Self-Encrypting Drive (SED) technology has been standardized around conformance to Trusted Computing Group (TCG) specifications such as their TCG Storage's Security Subsystem Classes (SSC) including Enterprise and (more recently) Opal. Both of those SSCs support crypto-erase capability internal to the SED drives (which are a form of ECD) in multiple different ways. For example, there are at least four different ways to invoke an internal crypto-erase in the case of TCG's Opal SSC. But neither of those two TCG SSCs supports crypto-erase by an external entity independent of the SED itself, i.e., if the SED cannot honor a method (command) specified by the SSC. The MEK is always stored in the SED, typically in cryptographically wrapped form. If someone can, in some way, figure out how to break open the wrapped MEK, that person can recover all the associated ciphertext stored in a failed SED conforming to either the Enterprise or Opal SSC.

An SSC currently in development is called Key per IO. The fundamental concept of SSC is different than either Opal or Enterprise SSCs. Key per IO is instead expected to require external key management. It enables a large number of MEKs to be used within a single namespace, e.g., a Non-Volatile Memory Express (NVMe) namespace, which corresponds to a single Logical Block Address (LBA) range of a drive (or a subset of that drive such as a data band). All of the MEKs served to the ECDs conforming to the proposed Key per IO SSC would only be stored inside of that ECD in volatile form, and so typically disappear from the ECD once the device is powered off or reset. One problem with the Key per IO scheme is that it does not enable support of internal crypto-erase. Therefore, if one of the externally managed MEKs is obtained, e.g. by an attacker, the ciphertext (encrypted data) encrypted with that MEK becomes accessible.

In conventional storage systems based on ECDs, if an ECD is deemed marginal, e.g., defective or expected to break soon, the first thing typically done is to start the process of taking that marginal ECD out of the storage system. Before returning it to its manufacturer, there would typically be an attempt to perform some kind of secure erase of all the data on the ECD. One way of doing this is erase all the ciphertext, preferably via a verified erasure of all data on that ECD. In the case of ECDs of the solid state drive (SSD) type, this is often performed by attempting to page erase all the pages in the flash memory chips in the flash drive. This may or may not be successful. For example, it is possible that some page does not fully erase, which would leave some of the bits on the page uncleared, e.g. some residual ciphertext bits. In the worst case (e.g. if the page erase line is broken), there is fully readable ciphertext left. To guard against this worst case, standards like the National Institute of Standards and Technology (NIST) SP 800-88r1 on Media Sanitization require that drives verify each page erase by reading the pages that were erased to assure that all of the bits (or at least a sufficient sample of those bits) were in fact cleared (minus some acceptable background error rate). Unfortunately, it is well known that any attempt to perform a page erase on all pages may not succeed. In the case of SP 800-88r1, if all of the data (e.g. ciphertext) cannot be securely erased, then the drive must be physically destroyed, e.g. crushed and incinerated. Such drives cannot be reused, nor should they be returned to the manufacturer.

One of the changes in the r1 version of SP 800-88, vs the prior version, is that for certain types of data stored to ECD drives of the SSD type, NIST has determined that crypto-erase is an acceptable way to securely erase or sanitize the SSDs (i.e. it would be sufficient to then allow those SSDs to be reused or returned to the manufacturer). Accordingly, for certain types of storage media such as ECD of the SSD type, an alternative to erasure of all ciphertext is to do a crypto-erase. The problem is that, as presently proposed, no Key per IO-enabled drive would be capable of independently performing a crypto-erase, and thus the only option the storage system realistically has, with standard Key Per IO, is to transparently (to the host) wipe the data on a marginal drive being removed from a system by way of attempting to erase all the ciphertext on it, which may fail, as discussed in the prior paragraph.

SUMMARY

With crypto-erase now made possible, crypto-erase can be performed instead of erasure of all the ciphertext. Alternately, the crypto-erase may be done in addition to erasure of all ciphertext. If so, these two operations may be performed in any order.

A device-implemented method, according to one aspect of the present invention, includes receiving, at a device configured to perform data operations on a storage medium, one or more unique external keys, the one or more external keys being served to the device from one or more external sources for Key per IO operation. An internal key stored within the device is accessed. A unique MEK is generated for each of at least some of the one or more external keys using the internal key and the associated one of the one or more external keys, each MEK being associated with the external key used for generation thereof. In response to receiving a request to perform a data operation for data associated with one of the one or more external keys, the MEK associated with that external key is used to encrypt and/or decrypt the data.

The foregoing method enables internal crypto-erasure of the data stored in a Key per IO scheme by implementing the internal key, which is combined with the external key to generate the MEK, which is in turn used to encrypt/decrypt the tenant's data. Because no tenant, and ideally no one and nothing external to the ECD, has access to the internal key, destruction of the internal key renders the data crypto-erased, and thus unrecoverable.

In preferred approaches, the device is configured to prohibit transfer of the internal key to outside of the device. Accordingly, because the internal key cannot leave the device, destruction of the internal key stored within the device and the MEKs associated with it effectively crypto-erases all data written using the MEKs, and ensures the MEKs cannot be regenerated using the internal key.

In some approaches, several of the external keys are individually associated with unique data stored at different locations in a same logical block address range. Such approaches advantageously enable tenants to share a same namespace on an ECD. Because the internal key is combined with a first tenant's specific external key to create a MEK that is then used to write and read data for that tenant, even if multiple tenants share an address space, no other tenant can unencrypt the first tenant's data without the first tenant's external key.

A device-implemented method, according to another aspect of the present invention, includes receiving, at a device configured to perform data operations on a storage medium, a request to write first data to the storage medium in encrypted form using a first external key associated with the first data. An internal key stored within the device is accessed. A first MEK is generated using the internal key and the first external key. The first data is encrypted using the first MEK. The encrypted first data is written to the storage medium in a first logical block address range of the storage medium. A second request is received, the second request being to write second data to the storage medium in encrypted form using a second external key associated with the second data. The internal key stored within the device is accessed, and a second MEK is generated using the internal key and the second external key. The second data is encrypted using the second MEK. The encrypted second data is written to the storage medium in the first logical block address range of the storage medium.

The foregoing method enables internal crypto-erasure of the data stored in a Key per IO scheme. Moreover, this aspect retains Key per IO's enablement of two or more tenants being able to share a same namespace on an ECD without allowing one tenant to access another tenant's data within that shared namespace.

A device-implemented method for crypto-erase, according to yet another aspect of the present invention, includes receiving, at a device configured to perform data operations on a storage medium using Key per IO operation, a request to cause crypto-erasure of all data in at least one logical block address range of the storage medium. Individual portions of the data in the at least one logical block address range are each associated with a unique external key, the individual portions of the data each being encrypted using a unique MEK created using an internal key and the unique external key associated with the portion of the data. Internal crypto-erase of that logical block range can be achieved by destroying the common internal key associated with that logical block range and all media encryption key(s) associated with the internal key.

The foregoing method enables internal crypto-erasure of the data stored in encrypted form in a Key per IO scheme.

In preferred approaches, the device is configured to prohibit transfer of the internal key to outside of the device. Accordingly, because the internal key cannot leave the device, destruction of the internal key stored within the device and all MEKs generated from it effectively crypto-erases all data written using those MEKs, and ensures the MEKs cannot be regenerated using that, now destructed, internal key.

In some approaches, several of the external keys are individually associated with unique data stored at different locations in a same logical block address range. Such approaches advantageously enable tenants to share a same namespace on an ECD. Because the internal key is combined with a tenant's specific external key to create a MEK that is then used to write and read data for that tenant, even if tenants share an address space, no other tenant can unencrypt the first tenant's data without the first tenant's external key.

A computer program product for enabling crypto-erase includes a computer readable storage medium having program instructions embodied therewith, the program instructions executable by a device configured to perform data operations on a storage medium to cause the device to perform any of the methodology presented herein.

Systems, according to various aspects of the present invention, include a device configured to perform data operations on a storage medium. Such device has a processor and logic integrated with the processor, executable by the processor, or integrated with and executable by the processor, the logic being configured to cause the device to perform any of the methodology presented herein.

Various approaches described herein are applicable to many types of storage media, including non-volatile memory and magnetic recording tape.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 8 is a chart contrasting the current state of the art for retiring and securing Key per IO-enabled storage products against procedures enabled by aspects of the present invention.

DETAILED DESCRIPTION

Figure 1:
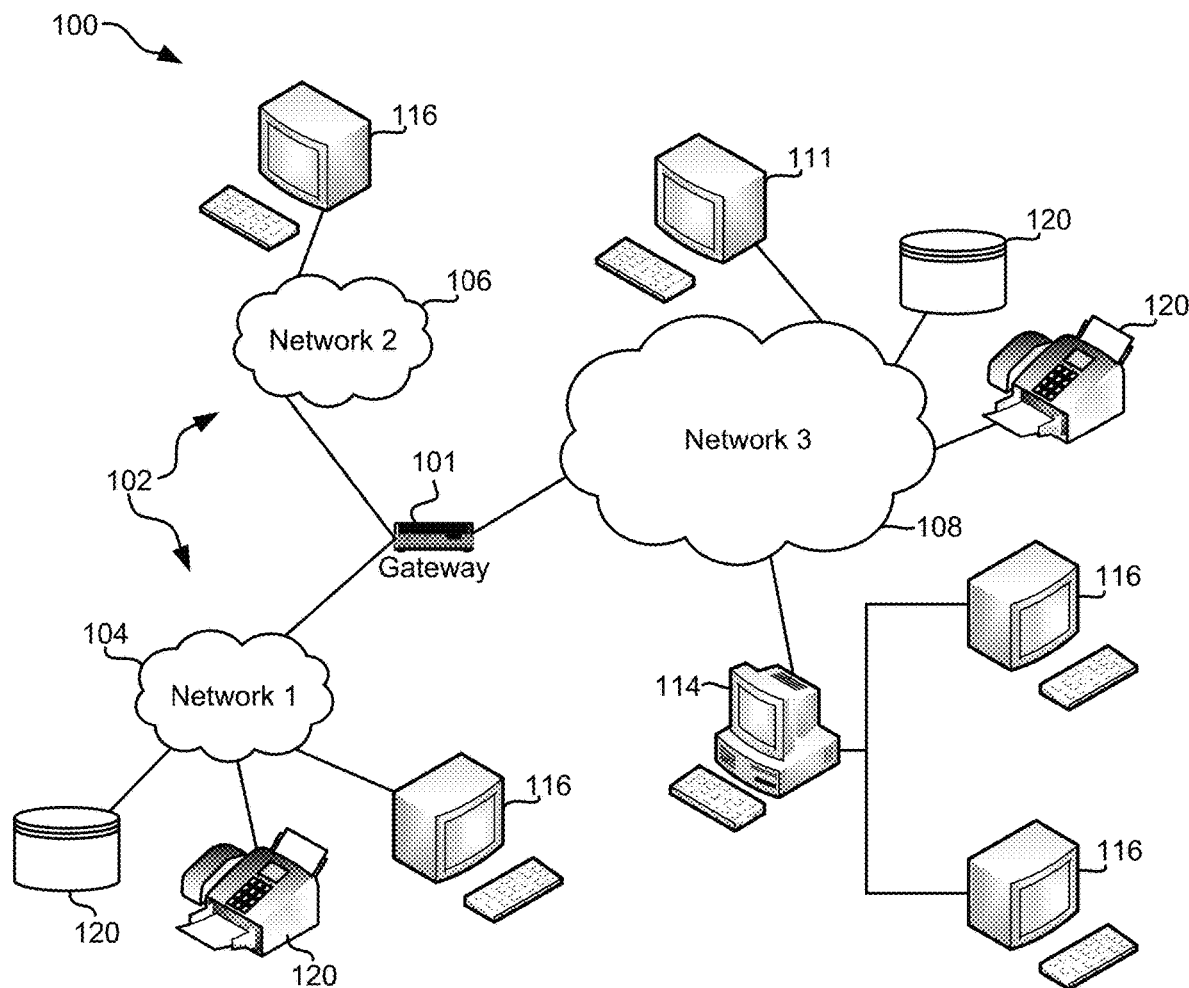
FIG. 1 is a diagram of a network architecture, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description herein discloses several preferred approaches of systems, methods and computer program products for enabling locally encrypted data to be crypto-erased by internal action in Key per IO-enabled devices. In various approaches, the externally served "encryption" key, Kext, is not used directly, instead an internal key, Kint, is combined with the Kext. The combination of those two keys is used as the actual media encryption key (MEK).

In one general approach, a device-implemented method includes receiving, at a device configured to perform data operations on a storage medium, one or more unique external keys, the one or more external keys being served to the device from one or more external sources for Key per IO operation. An internal key stored within the device is accessed. A unique MEK is generated for each of at least some of the one or more external keys using the internal key and the associated one of the one or more external keys, each MEK being associated with the external key used for generation thereof. In response to receiving a request to perform a data operation for data associated with one of the external key(s), the MEK associated with that external key is used to encrypt and/or decrypt the data.

In another general approach, a device-implemented method includes receiving, at a device configured to perform data operations on a storage medium, a request to write first data to the storage medium in encrypted form using a first external key associated with the first data. An internal key stored within the device is accessed. A first MEK is generated using the internal key and the first external key. The first data is encrypted using the first MEK. The encrypted first data is written to the storage medium at some first logical block address in a first logical block address range of the storage medium. A second request is received, the second request being to write second data to the storage medium in encrypted form using a second external key associated with the second data. The internal key stored within the device is accessed, and a second MEK is generated using the internal key and the second external key. The second data is encrypted using the second MEK. The encrypted second data is written to the storage medium at some second logical block address in the first logical block address range of the storage medium.

In yet another general approach, a device-implemented method for crypto-erase includes receiving, at a device configured to perform data operations on a storage medium using Key per IO operation, a request to cause crypto-erasure of all data in at least one logical block address range of the storage medium. Individual portions of the data in the at least one logical block address range are each associated with a unique external key, the individual portions of the data each being encrypted using a unique MEK created using an internal key and the unique external key associated with the portion of the data. Crypto-erasure is achieved by destroying the internal key and any MEK or MEKs that have been generated from that internal key.

Illustrative Computing Environment

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
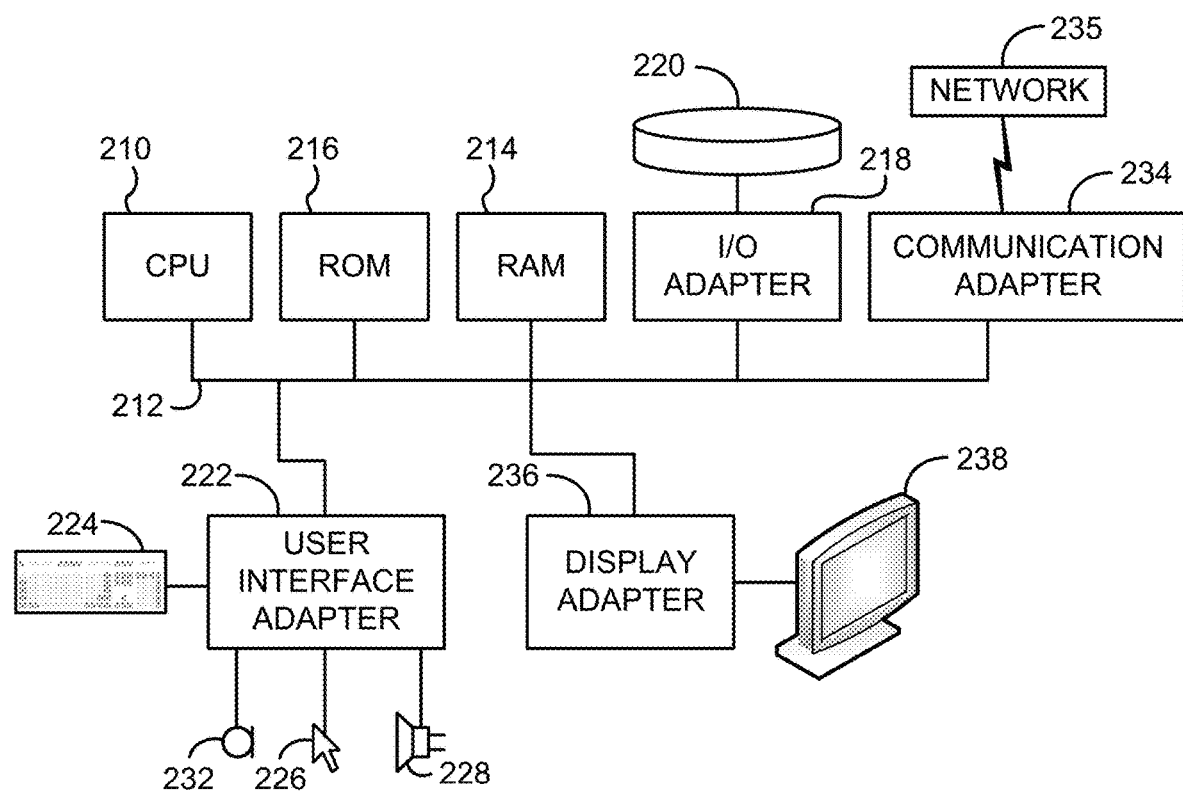
FIG. 2 is a diagram of a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g. a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred approach may also be implemented on platforms and operating systems other than those mentioned. A preferred approach may be written using eXtensible Markup Language (XML), C, and/or C++ language, or other programming languages, along with an object-oriented programming methodology. Object oriented programming (OOP), which has become increasingly used to develop complex applications, may be used.

Figure 3:
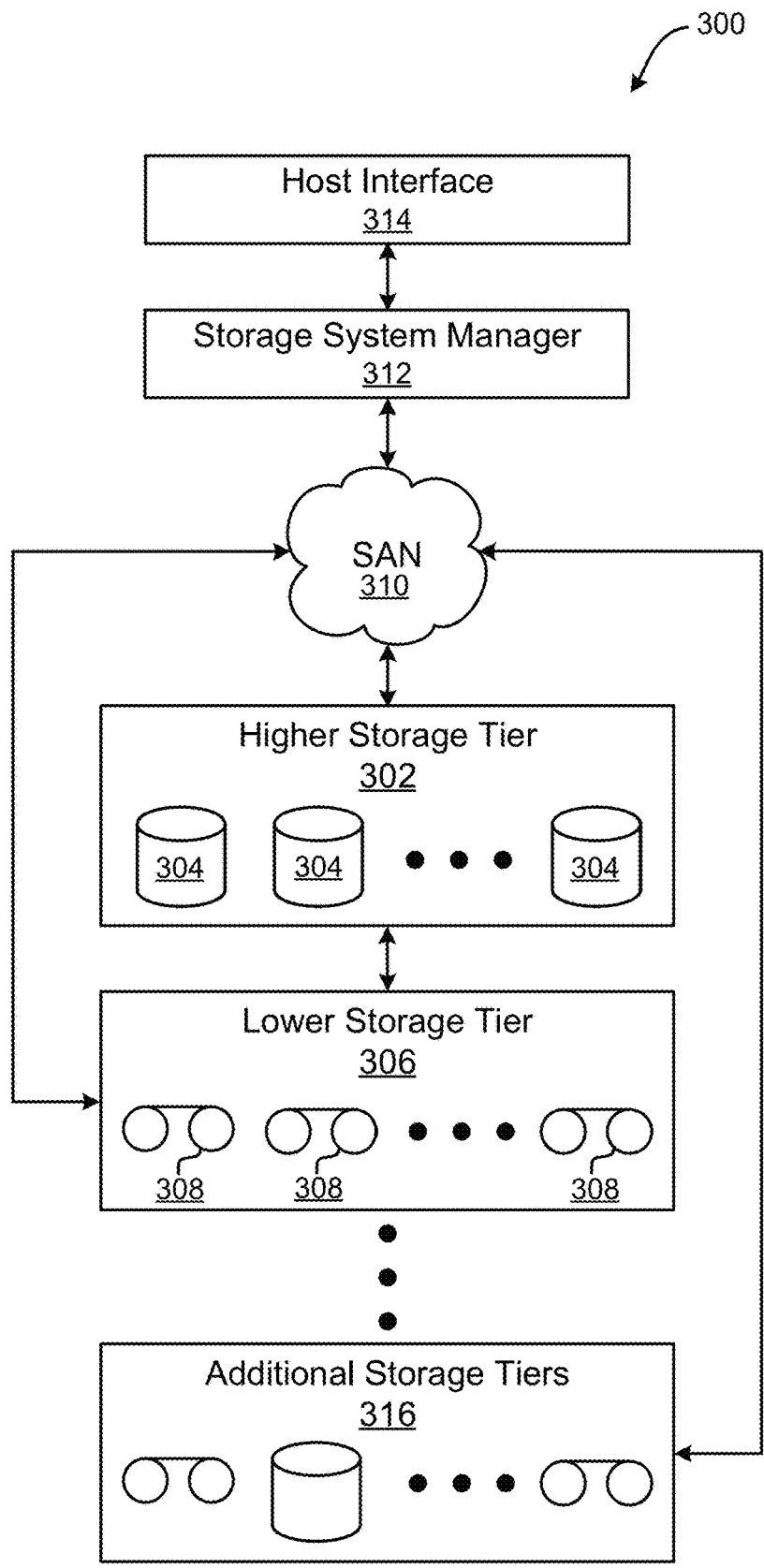
FIG. 3 is a diagram of a tiered data storage system, in accordance with one aspect of the present invention.

Now referring to FIG. 3, a storage system 300 is shown according to one approach. Note that some of the elements shown in FIG. 3 may be implemented as hardware and/or software, according to various aspects. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), non-volatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches and aspects presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

Key Per IO Fundamentals

It is desirable in some cases to allow different entities to use the same address space in a storage device. A simplistic implementation of this, however, does not give a first entity any assurance of privacy from a second entity which could simply read what the first entity wrote. One solution to this is having each entity (or tenant) use a unique key which they can manage external to the device which the device requires to encrypt their write data and to decrypt their encrypted ciphertext. That key will be referred to herein as an external key, an external MEK, and Kext. Particularly, each tenant has a unique Kext with which to encrypt the respective tenant's data, and that Kext is different than the Kexts of the other tenants. This scheme is generally referred to as a Key per IO scheme.

When a Key per IO-enabled device (e.g., ECD, computer, etc.) powers up, it has no Kexts to perform encryption or decryption. Rather, Kexts are served to it in any desired manner, e.g., as needed, in conjunction with a request for a read or write operation, etc. For example, a tenant may send a Kext and along with a key tag (e.g. T) by which it will be referenced in the future, which the device stores in volatile memory. Then, when the device receives a command (e.g. NVMe command) which includes the key tag T as part of the command header, it retrieves the associated Kext from memory and uses it to encrypt plaintext data being written by the host before the ciphertext is stored to non-volatile memory, or to decrypt ciphertext data being read from non-volatile memory before the corresponding plaintext is sent to the host. The device may accumulate multiple Kexts associated with different key tags. In some approaches, if the power is lost, the Kexts, having only been stored in volatile memory, will be lost and thus need to be re-served to the device after it is powered back on before they can be used again.

A goal of many Key per IO schemes is to allow different tenants (users, applications, computers, etc.) to share the same address space. Prior to the inventive features presented herein, a tenant's Kext was directly used as the MEK to encrypt and decrypt the tenant's data. In theory, the encrypted data of a first tenant is secure against cleartext access by a second tenant so as long as their respective Kexts are unique from one another and remain secure from usage by the other tenant. When a first tenant, or control infrastructure responsible for first tenant's data, wants to erase the first tenant's data on the device, the first tenant destroys the first tenant's Kext external to the device, e.g., by erasing the Kext, overwriting the Kext, or otherwise destroying the Kext, including any residual copies of the Kext not only external to the device, but also any copy or copies stored in volatile memory internal to the device. Specifically, if there is any possibility that first tenant's Kext has been served to the device since its last power cycle or cold boot, the first tenant almost must instruct the device to erase the Kext which is used as a MEK internal to the device. By destroying all instances of the Kext external and internal to the device, this would effectively crypto-erase the data encrypted with that MEK still stored to and recoverable from that device. However, if, unbeknownst to the entity destroying Kext instances, someone or something has been able to record that tenant's Kext (e.g. by hacking into the external key store, or eavesdropping as it is communicated to the device, etc.) and keep a copy of it, that person can potentially still access the tenant's data, by decrypting their ciphertext, if they can network into the device. Thus, one cannot assure that the data is secure, nor that a definitive crypto-erase has been accomplished.

Moreover, as alluded to above, the Kexts are all managed externally, and when the storage device is powered off, all MEKs (i.e. Kexts used as MEKs) internal to the device should be lost, because they are only stored in volatile memory. However, a potential problem arises when the device or other data storage device fails, or is deemed marginal, and is to be removed from service. Because of the possibility that not all copies of a given Kext are on-line, or that they may have surreptitiously been copied, with Kexts that are managed externally, it can be difficult, if not impossible, to ensure that all Kexts that were associated with encrypting data written to that device have truly been destroyed externally. Thus, one cannot ensure that all data encrypted with a given MEK on the device is unrecoverable.

The present invention provides a way to internally crypto-erase the data stored in a Key per IO scheme by implementing an internal key (Kint), which is combined with a tenant's Kext to generate a MEK, which is in turn used to encrypt/decrypt the tenant's data. Because no tenant, and ideally no one, has access to the Kint, destruction of the Kint renders the data crypto-erased.

The ratio of internal Kints to external Kexts can vary from implementation to implementation. In some approaches, there may be one common Kint for all namespaces (e.g., for the whole drive). Accordingly, there may be an immense number of external Kexts, but only one Kint. In that case, the entire device can be crypto-erased by simply deleting the one common Kint.

In other approaches, a unique Kint may be provided for each namespace and/or for a subset of a namespace. Accordingly, some devices may use multiple Kints.

Inventive Methods for Enabling Crypto-Erase in Key Per IO-Enabled Devices

The following description discloses several preferred approaches of systems, methods and computer program products for enabling locally encrypted data to be crypto-erased by internal action in Key per IO-enabled devices such as ECDs. In general, data is encrypted and/or decrypted using a MEK created from an external Kext and an Kint stored within the storage device, e.g., ECD, SED, tape cartridge, portable memory, etc. Upon destruction of the Kint and of all MEKs created from it, all data which was only stored encrypted with that MEK is crypto-erased, and thus becomes unrecoverable. Similarly, destruction of all copies of an Kext crypto-erases the data corresponding to that Kext.

Moreover, because the Kint is combined with a tenant's specific Kext to create a MEK that is then used to write and read data for that tenant, even if tenants share an address space, no other tenant can unencrypt the first tenant's data without the first tenant's Kext. Accordingly, several Kexts may be individually associated with unique data stored at different locations in a same logical block address range, the allowed range of logical blocks (e.g. in the NVMe namespace) of the storage medium, which may be millions of sectors long. This is not to be confused with the range of an individual write command which would, with Key per IO, all be written with a single Kext specified by the key tag that arrived in the header of that write command.

Crypto-Erase in ECD and SED

While much of the following description is presented in association with an exemplary implementation with a SED or ECD of any type, this has been done by way of example only and solely to provide a context as an aid for the reader. Accordingly, the concepts and teachings presented hereinbelow are equally applicable to implementations with storage media such as magnetic recording tapes, memory cards, optical media, etc., and related devices.

Figure 4:
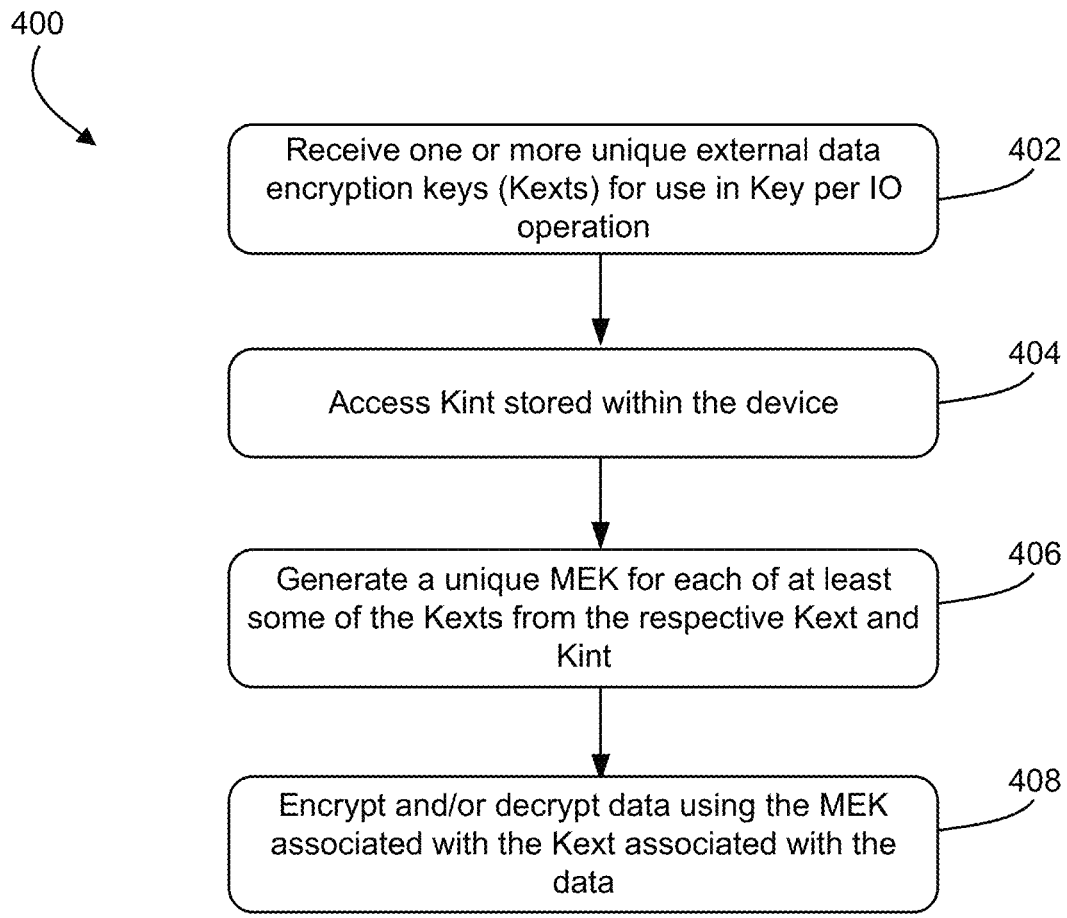
FIG. 4 is a flowchart of a method, in accordance with one aspect of the present invention.

Now referring to FIG. 4, a flowchart of a method 400 is shown according to one approach. The method 400 may be performed in accordance with the present invention in any of the environments depicted in the other FIGS. described herein, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a device such as a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a device, that is configured to perform data operations on a storage medium such as reading and/or writing data from/to the storage medium, receives one or more unique external encryption keys (Kexts). The one or more Kexts are served to the device from one or more external sources for use in Key per IO operations. An external source may be any external source. For example, the external source may be an application running in a virtual machine, or container, or natively on a host server which is writing or reading data, or a control infrastructure which handles all the key provisioning transparently to those applications, virtual machines, containers, or host servers. The external source could also be a key store, a key server, a key input by a user (e.g. via a keyboard, by insertion of a flash drive, etc.).

The Kext(s) are preferably stored in the device only in volatile memory, so that they are destroyed upon power down or reboot of the device. The Kext(s) may be received in any suitable manner, such as: as needed, all at once, in response to a request for an Kext (e.g., from the device), etc. For example, a Kext may be received in conjunction with a request to read, or write, data stored, or to be stored, on the storage medium in encrypted form.

The storage medium may be any type disclosed herein, e.g., magnetic tape, magnetic disk, NVRAM, etc. Accordingly, the device may be any type of data storage device, e.g., tape drive, SSD, HDD, encryption-capable USB drives, NVRAM modules, etc. Moreover, the device may be an Encryption-Capable Drive (ECD) of the removable data storage type, such as an encryption capable USB drive, an encryption-capable tape drive, a self-encrypting drive (SED), etc.

In operation 404, a Kint stored within the device is accessed, e.g., from a non-volatile memory of the device. That non-volatile memory could be on a dedicated purpose IC such as a NAND flash, or could be embedded in some larger IC such as an FPGA, ASIC, CPU, etc. In some approaches, the Kint is stored in the device in raw (unencrypted) form. In other approaches, the Kint is stored in the device in wrapped form (e.g. encrypted form, password protected form, obfuscated form, etc.). In the case where Kint is stored in wrapped form, information such as another key, a password, etc., for unwrapping the Kint may be retrieved and/or received and used to unwrap the Kint. For example, a lock/unlock PIN or password required to unlock the device may be used as the wrapping key used to wrap the internal key. Alternatively, a Key Encrypting Key (KEK) could be use as the wrapping key to wrap the internal key. Preferably, the only non-volatile storage of the internal key would typically be in wrapped form.

In preferred aspects, the device is configured to prohibit transfer of the Kint in any form to outside of the device. However, a microprocessor or controller internal to the device may access the Kint within the device.

In operation 406, a unique MEK is generated for each of at least some of the Kexts using the Kint and the associated one of the one or more Kexts. In other words, the MEK associated with a given Kext used for generation thereof is different than any other MEK. Any known technique may be used to create a MEK from the Kext and Kint, e.g. by XORing the Kext and Kint together, by applying another known hashing algorithm, by appending the two keys together to create a larger MEK, etc.

The MEK for a given data set may be created at any desired time. In one approach, the MEK is generated in response to receiving the Kext. In another approach, the MEK is created in response to receiving a request to perform a data operation for data associated with the Kext.

Regardless of when the MEK is created, it may be stored volatilely within the device for use and/or reuse, may be used for a data operation and discarded, etc. Preferably, the MEK is stored within the device only in volatile memory, so that it is lost when the device is powered down or reset. This helps ensure that the MEK is not accessible from outside the device, nor if the device becomes disabled.

In operation 408, in response to receiving a request to perform a data operation for data associated with one of the Kexts, the MEK associated with that Kext is used to encrypt and/or decrypt the data, e.g., using otherwise conventional encryption/decryption techniques. For example, in response to receiving a read request, the ciphertext of the requested data is decrypted using the appropriate MEK in operation 408 to give the unencrypted (i.e. cleartext) form of the requested data, which can then be output to the requestor. The ciphertext of the requested data may be copied into a buffer and then decrypted, may be decrypted "on the fly" during reading, etc. The decrypted data is output, e.g., to a requestor of the data over a host interface, etc.

In some approaches, the MEK is deleted upon completion of the associated request. In other approaches, the MEK may be retained in some form of volatile memory or register for reuse. In either case, the storage device may retain the Kexts and associated MEKs until told to forget them by explicit command or reset, or a power off causes them to be forgotten.

Aspects of the various operations of FIG. 4 are provided below. Such aspects are presented by way of example only, and are not intended to be limiting. As noted above, much of the present discussion refers to an ECD; this has been done by way of example only. Moreover, such aspects may be combined in any way, in accordance with the plethora of possible aspects and approaches to practice the present invention.

A MEK may be created from two separate keys using any technique known in the art and/or that would become apparent to one skilled in the art upon reading the present description. For example, one way to create a MEK which requires the use of both Kint and Kext to calculate is to have Kint and Kext be two independently generated random numbers, and then perform a calculation which requires both Kint and Kext, such as the bitwise XOR of the two together, or concatenation of these two values, to calculate the MEK.

Kint may originate from any conceivable source. Kint is preferably created internal to the ECD, this being the most secure approach, as copies of Kint would never need to exist outside of the ECD unless deliberately copied therefrom. For example, Kint is generated in a known manner using output from a random number generator within the ECD.

In other approaches, Kint may be created external to the ECD and served to the ECD. For example, Kint may be programmed into the device during manufacturing build, may be programmed into the device by an administrator, may be inserted into the device during configuration or formatting of it, etc.

In one aspect, Kint may be specific to a particular set of data, and thus the device may store multiple unique Kints, each associated with a unique dataset.

Preferably, the ECD is configured to not allow any external visibility of Kint or transfer or copying of Kint out of the ECD.

In an illustrative approach, Kint is the first value required in the creation of the MEK, e.g. a first random number the same length (in bits) as the MEK. Kext is the second value required in the creation of the MEK, e.g. a second random number the same length as the MEK. Kint is processed with Kext in a predefined manner to generate a resulting MEK. For example, Kint may be XORed (or the like) with Kext to generate the MEK. Alternately, standard key derivation techniques (e.g. using hashing or encryption) can be used instead of the XOR operation (or the like) to calculate the MEK. Any form of key derivation which requires processing of both Kint and Kext for calculation of the MEK is potentially acceptable.

Anyone familiar with the complexity of a ECD capable of supporting the Key per IO SSC would appreciate that there are many, many ways to implement this concept, and accordingly, the invention is not limited to the exemplary description presented herein.

In one approach, a unique Kint is created to combine with each of the Kexts. Alternately, there could be fewer Kints than Kexts, down to the aforementioned single Kint that is combinable with all the Kexts. Accordingly, there could be potentially thousands of Kexts combinable with several or as few as one Kint, i.e. a many to many, a many to fewer, or a many to one relationship exists.

In another approach, the MEK is created using more than one Kint and the Kext. For example, two different Kints could be combined with an Kext, so that the net result is the combination of three different keys. Erasure of any of the three keys crypto-erases any data encrypted with the combined key. Accordingly, more than two keys are combined to create a MEK in some approaches. Thus, for example, if one of the Kints is common for the entire NVMe namespace, and the other Kint is unique for every Kext, then the ability to either crypto-erase all data in the NVMe names space at once (by overwrite or erasure of the first Kint which is common to all Kexts) or by tenant (by overwrite or erasure of the second Kint which is finer grained and, in the limit, may be unique per resultant combined encryption key).

Note that there are other forms of creating a dependency on one or more Kints in a Key per IO scheme, which can provide some additional utility. For example, a tenant's data might first be encrypted using only the tenant's Kext. The resultant ciphertext may be encrypted a second time with using Kint. In this case, if a Keyless Copy is to be performed, then the dependency on Kint can be undone (removed) by performing a single decryption, which can be performed without the tenants' Key Per IO Kexts. This allows the ciphertext to be copied to a replacement device without any need to securely transfer any key (such as the MEK or Kint) from one device to another. Rather the two devices (e.g. a marginal device being taken out, and a spare device taking its place) can have completely independent Kints.

There are other ways to achieve similar capability as that discussed in the prior paragraph without requiring a full second encryption of all data, as would become apparent to one skilled in the art upon reading the present disclosure. Accordingly, there is no absolute requirement for there to be a secure transfer of a MEK associated with a Keyless Copy. There are solutions, such as the one discussed in the prior paragraph, which eliminate any need to do a secure transfer of any key associated with the ciphertext being read out of a marginal device.

In one illustrative approach, only the wrapped form of Kint is stored in non-volatile memory in the ECD. Kext is only stored outside of the ECD in non-volatile form and so has to be served to (or accessed by) the ECD at least once after a power cycle and/or cold boot to allow the MEK to be calculated. The MEK can be calculated only when the ECD has both Kint and Kext. Thus, Kext has to be served to (or accessed by) the ECD in some form. There are many ways this may be done, according to various aspects. One way is to have the Kext injected into the ECD wrapped with a Key Encrypting Key (KEK). Alternately, if the ECD supports a Key Management Interoperability Protocol (KMIP) client, it may request and receive Kext over a secure channel (such as protected by TLS or IPsec) from an external key manager of a type known in the art. Alternately, Kext may be served to the ECD in a manner similar to the way Personal Identification Numbers (PINs) are, e.g. in cleartext form, through a secure tunnel established for Security Protocol In and Security Protocol Out commands, etc.

Kint is preferably stored in the ECD in wrapped form and is unwrappable until the wrapping key (which may be a KEK or may instead be dependent on one or more password(s) or PIN(s), served to the ECD to authenticate one or more different roles the ECD supports (e.g. Admin1)) is provided. Accordingly, whatever parts of the wrapper key are provided from outside of the ECD are served to the ECD to allow Kint to be unwrapped. Once the ECD has been served, or has accessed, all the required information (including Kext) necessary to calculate the MEK, the ECD calculates the MEK and then is capable of decrypting existing ciphertext to produce the resultant cleartext (e.g. to respond to a Host Read), or encrypting newly received customer data in cleartext form to ciphertext (e.g. to honor a Host Write).

In one approach, Kint is internally generated and is wrapped with either a KEK or with the PIN associated with some Administrative Security Provider (hereafter "AdminSP") role, e.g. Admin1. Kint can thus be accessed once the KEK is injected into the ECD or the entity such as Admin1 has authenticated with its password or PIN.

The KEK or PIN which wraps Kint may be allowed to change as part of a rekey (of the wrapping key) operation. Kint itself may also be rekeyed, but this would result in crypto-erasure of data encrypted by the MEKs that have been created from the Kint in use before the Kint was rekeyed.

One implementation includes having the ECD be the source of the generation of the Kints in some or all cases using the same type of internal random number generation capability that is invoked for example by the Random command.

Figure 5:
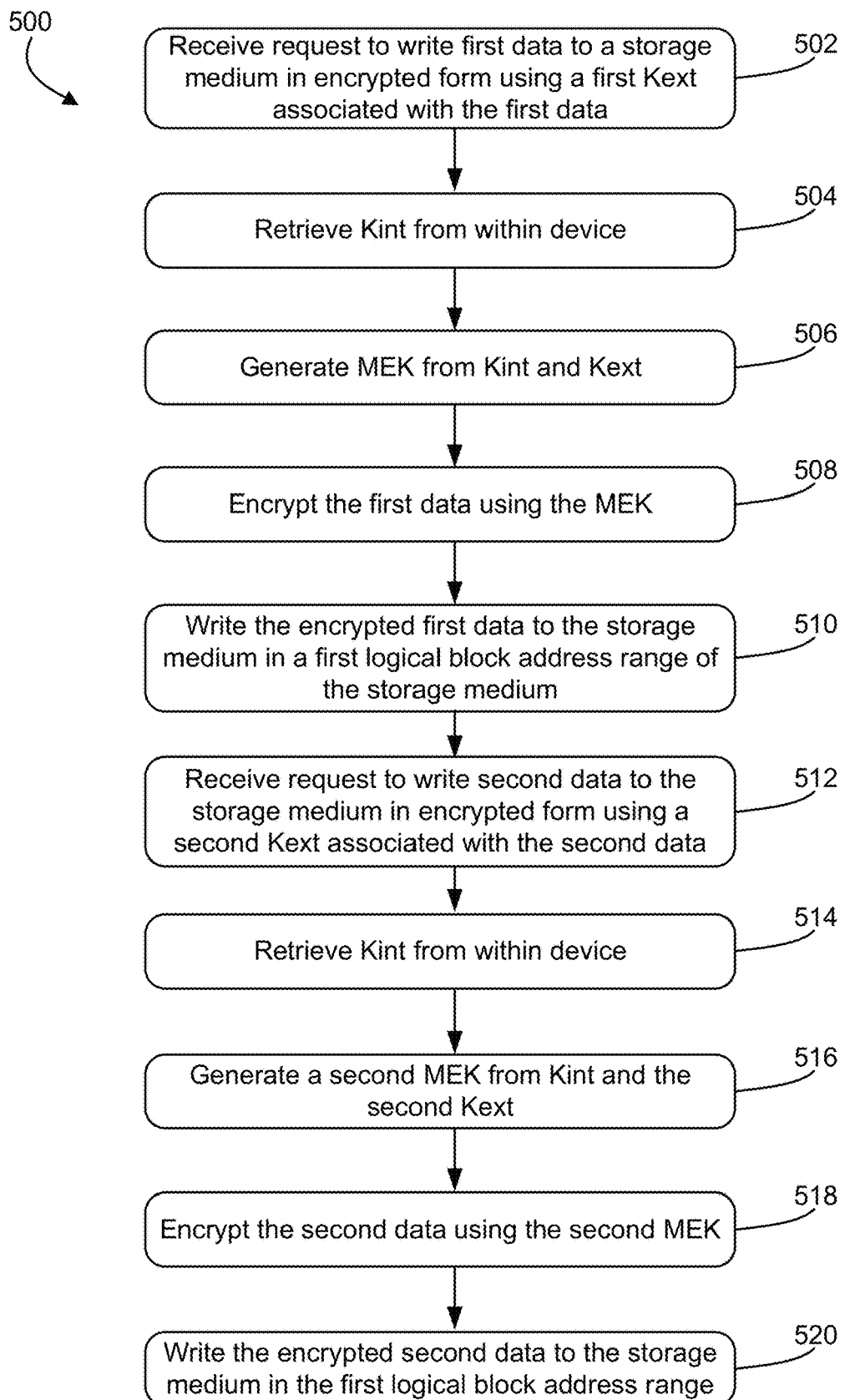
FIG. 5 is a flowchart of a method, in accordance with one aspect of the present invention.

Now referring to FIG. 5, a flowchart of an exemplary method 500 for writing crypto-erasable data in a Key per IO scheme is shown according to one approach. The method 500 may be performed in accordance with the present invention in any of the environments depicted in the other FIGS, described herein, especially FIG. 4, among others, in various approaches. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various approaches, the method 500 may be partially or entirely performed by a device such as a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

In operation 502, a request is received at a device configured to perform Key per IO data operations on a storage medium. The request is to write first data to the storage medium in encrypted form using a first Kint associated with the first data.

In operation 504, a Kint stored within the device is accessed.

In operation 506, a first MEK is generated using the internal key and the first external key.

In operation 508, the first data is encrypted using the first MEK.

In operation 510, the encrypted first data is written to the storage medium in a first logical block address range of the storage medium. The first logical block address range is preferably the allowed range of logical blocks (e.g. in the NVMe namespace) of the storage medium, which may be millions of sectors long. This is not to be confused with the limited range of the specific write command which is all associated with a single Kext.

In operation 512, a second request is received at the device. The second request is a request to write second data to the storage medium in encrypted form using a second external key associated with the second data, where the second external key is different than the first external key.

In operation 514, the internal key stored within the device is accessed.

In operation 516, a second MEK is generated using the internal key and the second external key.

In operation 518, the second data is encrypted using the second MEK.

In operation 520, the encrypted second data is written to the storage medium in the first logical block address range of the storage medium. The second write could be to any logical block address range in the allowed range of logical blocks (e.g. in the NVMe namespace) which may or may not overlap with range of logical blocks written by the first write command.

Additional operations may be performed in this method 500, and any of the features described herein can be implemented in the method 500.

Figure 6:
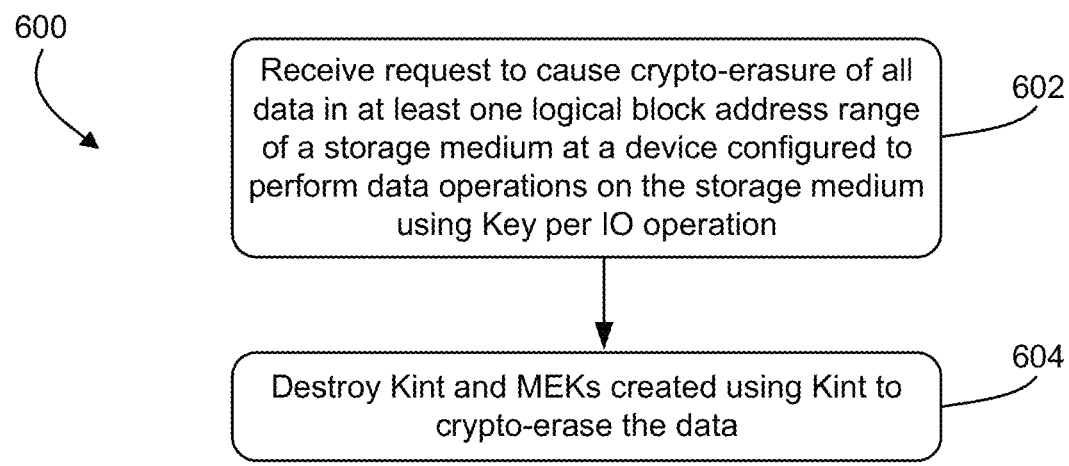
FIG. 6 is a flowchart of a method, in accordance with one aspect of the present invention.

Now referring to FIG. 6, a flowchart of an exemplary method 600 for performing crypto-erase on data in a Key per IO scheme is shown according to one approach. The method 600 may be performed in accordance with the present invention in any of the environments depicted in the other FIGS, described herein, especially FIGS. 4-5, among others, in various approaches. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various approaches, the method 600 may be partially or entirely performed by a device such as a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

In operation 602, a request to cause crypto-erasure of all data in at least one logical block address range of a storage medium is received at a device configured to perform data operations on the storage medium using Key per IO operation. Individual portions of the data in the at least one logical block address range are each associated with a unique Kext, e.g., corresponding to unique tenants. The individual portions of the data are each encrypted using a unique MEK created using a Kint and the unique Kext associated with the portion of the data.

In operation 604, the crypto-erase is achieved by destroying both Kint (e.g., by erasing Kint, overwriting Kint, and/or physically destroying a memory storing Kint) and any MEK(s) in the device created from that Kint.

Cryptography

Kint and Kext can be XOR'd together, or otherwise combined, to create the MEK.

One way to verify that the resultant MEK is correct (e.g. vs. being one bit off, which would happen if Kext was one bit off), a key signature concept may be used. The key signature concept includes using the MEK to encrypt a known value, and the resultant ciphertext is then stored as the signature of that MEK.

Note that, in some of the foregoing approaches, both Kext, Kint, and any key used to wrap Kext (such as the Key Encrypting Key (KEK) and Kint have become what is called a Cryptographically Sensitive Parameters (CSPs). If there is any chance the data passing between the ECD and the host could be recorded, the channel between them should be protected with some form of encryption. One option detailed by Key per IO is use of a KEK known by the host and ECD, the host wrapping the Kext with the KEK before sending the wrapped Kext to the ECD, and the ECD receiving that wrapped Kext and unwrapping with that same KEK. Another option is use of data in flight (EDiF) such as Internet Protocol Security (IPsec), Fibre Channel-Security Protocol (FC-SP), or Transport Layer Security (TLS). In some data centers there is no concern about data being passed back and forth to a ECD in their internal environment; the concern is only what happens to that ECD after it leaves that protected environment, which is why absolute assurance of crypto-erase is desirable.

Note that in the case of XTS mode of encryption (e.g. XTS-AES-256) there are two encryption-related keys, an encryption key and a separate tweak key. In some approaches, both of these keys can be generated (via key derivation) from a single root key. Accordingly, a 256-bit MEK can be provided and may be used to generate (via key derivation) the two 256-bit keys required for XTS-AES-256.

Crypto-erase options in ECDs which have implemented various aspects of the present invention include not only the required destruction (e.g. by overwrite or erasure) of any MEKs inside the ECD, but also one or more of the following:

1. If a user wants to crypto-erase all data on an operational ECD, the user simply invokes one of the multiple different ways to do so as suggested herein. For example, the wrapped key structures containing Kint are overwritten and Kint is now unrecoverable. In this scenario there is no need to also erase every Kext, the MEKs are unrecoverable and cannot be regenerated because Kint is gone.

2. If a user wants to crypto-erase a ECD (possibly because it is a non-operational ECD, which does not respond to commands, or a missing ECD), but cannot do '1' for whatever reason, the user now has another option—to instead instruct each tenant to erase their Kext, independent of the ECD. In this scenario there is no need to erase all the wrapped versions of Kint; the MEK is unrecoverable because Kext is gone. In this scenario, even if someone could, at some point in the future, break open the wrapped key structures of a failed ECD and so gain access to Kint, they have done all that work to no avail as the MEK remains unavailable. For that they need Kext which has been destroyed. Accordingly, they are still left in the scenario where the only viable path to accessing customer data is to break the encryption algorithm (e.g. XTS-AES-256) protecting the ciphertext of the user data itself.

3. If a user is especially concerned with security of the crypto-erase, the user may choose to delete both Kint and Kext. This scenario may be most likely if there is concern that Kext might have been recorded (e.g. in flight to the ECD, even if protected by some wrapping such as a secure channel the security of which was (or perhaps could be subsequently) broken). But there should be no reason, otherwise, to require the deletion of both Kint and Kext, because of the cryptography involved. One general approach is fairly resilient (e.g. to the ECD becoming non-operational) is to always attempt to erase both Kint and Kext, but to be satisfied so long as there is verification that one of those two erasures succeeded.

4. If a tenant wants to crypto-erase the tenant's data, the tenant may destroy the tenant's Kext. Any copy of the tenant's Kext on the ECD (and any associated MEK) should also be deleted, e.g., by power cycling the device, or by invocation of the Clear Single MEK or Clear All MEKs commands.

Crypto-Erase for Magnetic Recording Tape and Other Portable Memory

As noted above, in some approaches, encrypted data is stored on a non-volatile storage medium such as a magnetic recording media (e.g. tape, disk) or solid-state memory (e.g. NAND flash, NVRAM, etc.). Again, any of the operations, concepts, etc. presented above may be used in the present approaches. For example, the operations of methods 400, 500 of FIGS. 4-5 are performed with minor modifications noted below.

In some approaches, Kint may be stored in a particular device, e.g., drive, computer, etc. that operates with the medium.

In other approaches, especially those implementing removable media, Kint is stored on and/or with the storage medium. Accordingly, a method similar to methods 400, 500 of FIGS. 4-5 would instead retrieve the Kint from the medium on which the data is stored, from a memory physically coupled to the medium such as a cartridge memory, and the like. In cases where the Kint is to be destroyed, the structures that store Kint on the removable media are ideally destroyed.

Figure 7:
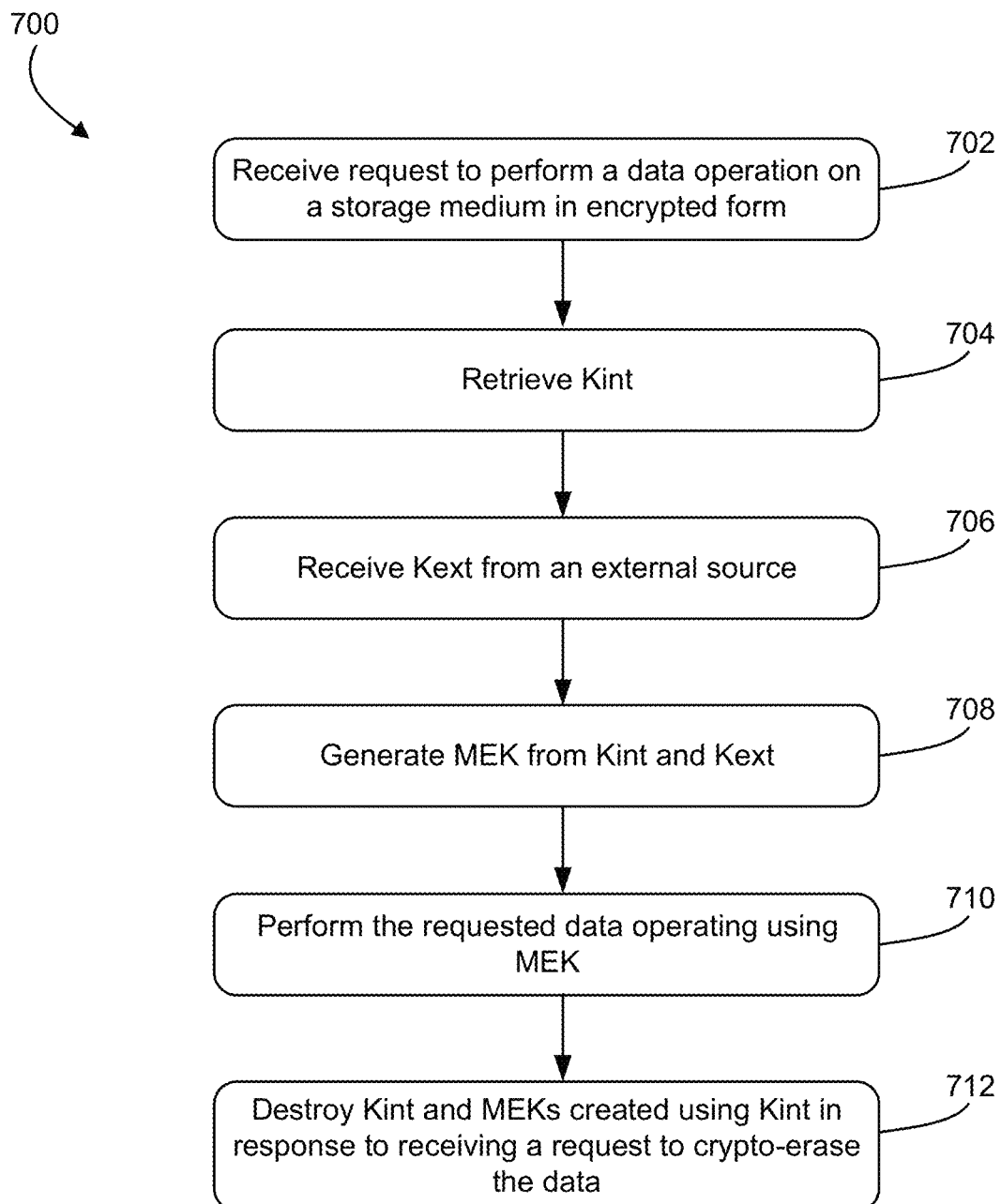
FIG. 7 is a flowchart of a method, in accordance with one aspect of the present invention.

Now referring to FIG. 7, a flowchart of a method 700 is shown according to one approach. The method 700 may be performed in accordance with the present invention in any of the environments depicted in the other FIGS. described herein, among others, in various approaches. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various approaches, the method 700 may be partially or entirely performed by a device such as a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a device, that is configured to perform Key per IO operation data operations on a storage medium such as reading and/or writing data from/to the storage medium, receives a request to perform a data operation on the storage medium in encrypted form. The request received may simply be a request to write data, a request to read data, or both. Moreover, the request may include additional information such as Kext. As above, the Kexts used in method 700 are preferably only stored in the device in volatile memory.

In operation 704, a Kint stored on and/or with the storage medium is retrieved. This procedure may include retrieving the Kint from the medium on which the data is stored, from a memory physically coupled to the medium such as a cartridge memory, and the like.

The storage medium may be any type disclosed herein, e.g., magnetic tape, magnetic disk, NVRAM, etc. Accordingly, the device may be any type of data storage device, e.g., tape drive, SSD, HDD, etc.

As noted above, in some approaches, the Kint is stored on and/or with the storage medium in raw (unencrypted) from. In other approaches, the Kint is stored on and/or with the storage medium in wrapped form (obfuscated form e.g., encrypted form, password protected form, etc.). Information such as another key, KEK, PIN, or password for unwrapping the Kint may be received and used to unwrap the Kint.

In preferred aspects, the device is configured to prohibit transfer of Kint in any form to outside of the device. However, a microprocessor or controller internal to the device may access Kint from the storage medium or other source that is coupled to the storage medium.

In operation 706, a Kext associated with the data is received from an external source. The external source may be any external source. For example, the external source may be the requestor of the data, a key store, a key server, a key input by a user (e.g. via a keyboard, etc.).

In operation 708, a MEK is generated using Kint and Kext. Any known secure technique may be used to create a MEK from Kint and Kext.

In operation 710, the requested data operation is performed, e.g., using the MEK and otherwise conventional techniques.

In operation 712, in response to receiving a request to crypto-erase data on the medium, Kint is destroyed, along with any MEKs created using that Kint.

If second data is to be stored by the device on the storage medium, the second data is received. Another external key (Kext2) may be received from a second external source. If so, a second MEK is generated using Kint and Kext2. The data operation is performed using the second MEK. Note that the second external source may be the same as the external source noted above, or different therefrom. However, Kext2 is different from Kext.

Aspects of the various operations of FIG. 7 are provided below. Such aspects are presented by way of example only, and are not intended to be limiting. Moreover, such aspects may be combined in any way, in accordance with the plethora of possible approaches of the present invention. For example, method 700 may have or incorporate similar features as those presented above in relation to FIGS. 4-6, e.g. such as key generation, etc.

Kint is stored with the storage medium, e.g. on the medium itself and/or with the storage medium e.g. in a separate memory. Kint is preferably stored in wrapped form. For example, Kint may be stored on a portion of a magnetic recording tape, in a tape cartridge memory, or both. That way, Kint is portable with the magnetic recording tape. Similarly, for an NVRAM device such as a memory stick, memory card, etc., Kint may be stored in the NVRAM of the device, in a separate memory of the device, etc.

Kint is preferably created internal to the device (e.g. drive, computer, etc.) operating on the storage medium. Preferably, the device is configured to not allow any external visibility of Kint or copying of Kint to outside of the device, except to the storage medium and/or memory coupled thereto. Preferably the device transfers Kint to the storage medium and/or memory coupled thereto and deletes Kint from elsewhere in the device. Thus, Kint only resides with the storage medium in some approaches, such as those associated with removable media devices.

In the case of a device where the storage media is integral to the device itself (e.g. a Self-Encrypting Drive (SED) type of HDD or SSD or Encryption-Capable Drive (ECD)), Kint may be stored within the device. For example, in a (possibly hermetically) sealed ECD enclosure, Kint could be kept anywhere inside that typically rectangular boundary. In the case of a SSD, the main non-volatile memory (where user data is stored) is often NAND flash. Kint (possibly in wrapped form) may be stored there as well. In other approaches, Kint may instead be kept in a separate (from user data) non-volatile memory inside the housing such as: in a different NAND flash or NOR flash chip; in magnetic random-access memory (MRAM); in spin-transfer torque random-access memory (STT-RAM); in ferroelectric random-access memory (FeRAM); in phase-change memory (PCM); in a resistive random-access memory (RRAM); in other forms of NVRAM (which is less technology specific than the preceding terms); etc. Note that Kint may also be stored in a form of ROM that can be erased, such as EEPROM. Thus, in various approaches, Kint may be stored in a different type of memory than the storage medium storing the user data.

In other approaches, Kint is created externally to the device and served to and stored in the device.

Kext can be created inside the device or externally to the device, or by joint contributions from inside and outside of the device.

In various approaches, Kext is provided to and/or stored in volatile memory (e.g. SRAM) in the tape drive, computer, etc. to allow the drive, computer, etc. to calculate the MEK. In one approach, Kext may be input to the tape drive, computer, etc. each time it is required. In another approach, once served to the device, Kext may be retained internal to the device stored in volatile memory on the tape drive, computer, etc., in which case Kext is preferably wrapped.

It should be appreciated that various approaches herein can be implemented with a wide range of memory mediums, including for example NVRAM technologies such as NAND Flash memory, NOR Flash memory, phase-change memory (PCM), magnetoresistive RAM (MRAM) and resistive RAM (RRAM). To provide a context, and solely to assist the reader, various approaches may be described with reference to a type of non-volatile memory. This has been done by way of example only, and should not be deemed limiting on the invention defined in the claims.

In one illustrative approach, Kint, in non-volatile form, is only stored with the storage medium in wrapped form. And Kext, while it may be stored temporarily in volatile memory, is only stored in non-volatile form outside of the storage medium.

The drive, computer, etc. operating on the storage medium retrieves Kint from the storage medium and receives or obtains Kext to allow the MEK to be calculated.

Kext, which is preferably not stored locally on the drive, computer, etc., may be served to the drive, computer, etc. in some form. There are many ways this may be done, according to various aspects, including any of the approaches listed in the previous section. For example, one way is to have the host wrap Kext with a KEK before transmitting it to the ECD. Another way is to have the drive, computer, etc.

support a KMIP client and to receive Kext over a secure channel from an external KMIP server (key manager) of a type known in the art.

Preferably, Kext can only be stored in volatile form inside of the ECD. A key to unwrap Kint (e.g. the KEK) may be received from the host, an external security orchestrator, a user, received from a key manager, etc.

Kint is preferably stored with the storage medium in wrapped form and is unwrappable upon the drive, computer, etc. being provided the wrapper key (which may be, or dependent on, the KEK or PINs served to the drive, computer, etc. to authenticate different users to different roles the drive, computer, etc. supports). Accordingly, whatever parts of the wrapper key are provided from outside of the drive, computer, etc. are served to the drive, computer, etc. to allow Kint to be unwrapped. Once the drive, computer, etc. has accumulated all the required information (including Kext) necessary to calculate the MEK, the drive, computer, etc. calculates the MEK and then is capable of decrypting existing ciphertext to produce the resultant cleartext (e.g. to respond to a Host Read), or encrypting new customer data in cleartext form to ciphertext (e.g. to honor a Host Write).

In Key per IO, the generation of Kext is done external to the ECD by a host or by a key manager the host interacts with.

In tape drive-implemented approaches, it is preferred that the Kint comes from the tape media, and the Kext comes from some interface, and that the calculation of the MEK is internal to the encryption-capable tape drive, and never leaves that tape drive.

Systems according to various approaches include a device configured to perform data operations on a storage medium, the device having a processor and logic integrated with the processor, executable by the processor, or integrated with and executable by the processor, the logic being configured to cause the device to perform some or all of the foregoing operations, e.g. the operations of FIGS. 4-7.

Computer program products for enabling and/or performing crypto-erase, according to various approaches, include a computer readable storage medium having program instructions embodied therewith, the program instructions executable by a device configured to perform some or all of the foregoing operations, e.g. the operations of FIGS. 4-7.

Exemplary Implementations

An illustrative process to protect a Key per TO encryption-capable storage device, such as an Encryption-Capable Drive (ECD), in accordance with one approach, includes the following operations:

1. Generate a Kint, and store that Kint internal to the storage device, in a secure fashion internal to the storage device. Typically, Kint would never be stored in cleartext form in non-volatile memory. Instead, Kint would be stored in wrapped form.
2. Kext is generated and stored external to the ECD:
   A. If Kext was created external to the storage device, have that Kext served, when required, to the storage device
   B. If key used to wrap the Kext (e.g. the KEK or PIN) is not already in the device, it also must be served to, or fetched by, the device and used to unwrap the Kext
   C. Typically, many Kexts are used, e.g. one for each tenant storing data on the ECD
3. The storage device uses Kint and Kext to calculate a MEK
4. The MEK is used directly or indirectly to encrypt data to create ciphertext, and to decrypt ciphertext to create cleartext An illustrative process after a power loss, or cold boot, to regain access to data on a Key per IO encryption-capable storage device, such as an Encryption-Capable Drive (ECD), in accordance with one approach, includes the following operations:

1. Have Kext served to the storage device
2. Access Kint internal to the storage device, which may involve cryptographically unwrapping Kint, which may require one or more wrapping or access keys (e.g. KEK(s) or PIN(s))
3. The storage device uses Kint and Kext to calculate a MEK
4. The MEK is used directly or indirectly to encrypt data to create ciphertext, and to decrypt ciphertext to create cleartext Process to Retire a Device or Secure a Stolen Device An illustrative process that may be performed when a storage device is to be retired, e.g., because its background error rate has gotten too large (e.g. which can happen because of too many write cycles), or perhaps because it "failed" and did not successfully complete some operation), in accordance with one approach, includes the following operations:

1. Send a command to the storage device instructing it to destroy its Kint and all MEKs presently inside the device which were generated by use of that Kint
2. Did the destroying of Kint and the MEKs complete successfully? If:
   Yes, the data encrypted under that MEK, or those MEKs, has been successfully crypto-erased
      in this case, while there is no need to destroy Kext, though this can also be done
   No, in this case one cannot trust that any crypto-erase has occurred:
      Destroy Kext external to the storage device, and so crypto-erase the data corresponding to that Kext on the storage device by external means
      Power off or cold boot the storage device to assure that the storage device is not retaining a volatile image of a key Note that key deletion may also be done in opposite order, with Kext being destroyed first, preferably with a subsequent attempt to delete Kint. An illustrative process in accordance with one approach, includes the following operations:

1. Destroy Kext external to the storage device, and so crypto-erase the data corresponding to the Kext on the storage device by external means, or destroy all Kexts to crypto-erase all data on the storage device
2. Send a command to the storage device instructing it to crypto-erase its Kint(s) associated with the Kext(s) corresponding to the data to be crypto-erased
3. Did the crypto-erase of Kint complete successfully? If:
   Yes, the data encrypted under that MEK, or those MEKs, has been successfully crypto-erased by destruction of Kint and Kext
      Cold boot of the storage device by use of the Power Cycle Reset command, or perform an actual power cycle (i.e. remove power for a time and then store it) to ensure that the storage device is not retaining a volatile image of any Kext or MEK No, but Kext external to the storage device has been destroyed, and so crypto-erase the storage device is effected by external means Note also that destruction or erasure of all of the Kexts and MEKs can be accomplished by powering off the device and/or performing a cold boot (e.g. as invoked by Power Cycle Reset). These MEKs can thus be destroyed last. But that destruction must be performed before the data encrypted with those MEKs is truly crypto-erased. In short, to achieve crypto-erase of data encrypted with one or more MEKs, either the MEKs and the associated Kint must be destroyed, or the MEKs and the associated Kexts must be destroyed.

Note also that if a storage device is stolen, or was not crypto-erased before it was removed from the storage system and is then lost e.g., in transit to another location, since a crypto-erase of data by destruction of Kint is no longer possible, because one doesn't have physical access to the storage device, one must instead destroy Kext, which, so long as it has not been recorded (e.g. surreptitiously), is possible even without physical access to the storage device.

FIG. 8 depicts procedures that may be performed on a marginal device without aspects of the present invention, contrasted with procedures that may be performed on a marginal device with one or more aspects of the present invention. The chart in FIG. 8 is self-explanatory, and is presented by way of example only. It should be noted that execution of crypto-erase in accordance with the last row of the chart in FIG. 8, i.e. by confirmed destruction of the Kint, is only made possible, in a Key per IO environment, if aspects of the present invention are implemented. Note also that if confirmed destruction of Kint, and of any MEKs presently in the device generated by use of Kint, is achieved, that crypto-erase of the data is achievable far faster (e.g. in less than a second) than is possible by confirmed "Erase all Ciphertext" as depicted two rows above that which might take as long as many hours to achieve (just the thorough confirmation, by read, that all pages have been thoroughly erased, perhaps by page erase, can take hours). Accordingly, aspects of the present invention can speed the sanitization of a ECD by several orders of magnitude.

A further case, which does not rely on, nor is inhibited by, use of aspects of the present invention, is selective crypto-erase of an individual tenant's data by destruction of all Kexts, and all MEKs created by use of the Kexts, used in connection with encryption of that tenant's data. Note that when the Kint used with those Kexts spans multiple tenants, including those with encrypted data that is to be retained (i.e. not crypto-erased), then that Kint is retained internal to the device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various approaches, the practical application or technical improvement over technologies found in the marketplace, or to enable others of ordinary skill in the art to understand the approaches disclosed herein.

What is claimed is:

1. A device-implemented method, comprising:
   receiving, at a device configured to perform data operations on a storage medium, one or more unique external keys, the one or more external keys being served to the device from one or more external sources for Key per IO operation;
   accessing an internal key stored within the device;
   generating a unique media encryption key for each of at least some of the one or more external keys using the internal key and the associated one of the one or more external keys, each media encryption key being associated with the external key used for generation thereof;
   in response to receiving a request to write first data associated with one of the one or more external keys to the storage medium in encrypted form, generating one of the unique media encryption keys using one of the external keys that is associated with the first data;
   using the media encryption key associated with that external key to encrypt the first data; and
   writing the encrypted first data in a first logical block address range of the storage medium.

2. The device-implemented method of claim 1, wherein the internal key is generated internal to the device.

3. The device-implemented method of claim 2, wherein the one or more external sources includes an application running on a host server which is writing or reading data.

4. The device-implemented method of claim 1, wherein the one or more external keys and the media encryption keys are only stored, in the device, in volatile memory.

5. The device-implemented method of claim 1, wherein the device is configured to prohibit transfer of the internal key in any form to outside of the device.

6. The device-implemented method of claim 1, wherein several of the external keys are individually associated with unique data stored at different locations in a same logical block address range.

7. The device-implemented method of claim 1, wherein one of the media encryption keys is created using more than one internal key.

8. The device-implemented method of claim 1, comprising performing crypto-erase of data written using the one or more media encryption keys created using the internal key by destroying the internal key and all associated media encryption key(s) in the device created using that internal key.

9. A computer program product for enabling crypto-erase, the computer program product comprising a computer readable storage medium having program instructions embodied therewith, the program instructions executable by a device configured to perform data operations on a storage medium to cause the device to perform the method of claim 1.

10. A system, comprising:
a device configured to perform data operations on a storage medium, the device having a processor and logic integrated with the processor, executable by the processor, or integrated with and executable by the processor, the logic being configured to cause the device to perform the method of claim 1.

11. A device-implemented method, comprising:
receiving, at a device configured to perform data operations on a storage medium, a request to write first data to the storage medium in encrypted form using a first external key associated with the first data;
accessing an internal key stored within the device;
generating a first media encryption key using the internal key and the first external key;
encrypting the first data using the first media encryption key;
writing the encrypted first data to the storage medium in a first logical block address range of the storage medium;
receiving, at the device, a second request to write second data to the storage medium in encrypted form using a second external key associated with the second data;
accessing the internal key stored within the device;
generating a second media encryption key using the internal key and the second external key;
encrypting the second data using the second media encryption key; and
writing the encrypted second data to the storage medium in the first logical block address range of the storage medium.

12. The device-implemented method of claim 11, wherein the internal key is generated internal to the device.

13. The device-implemented method of claim 11, comprising receiving the external keys from one or more external sources, wherein one of the one or more external sources is an application running on a host server which is writing or reading data.

14. The device-implemented method of claim 11, wherein the external keys and the media encryption keys are only stored, in the device, in volatile memory, whereby the external keys and the media encryption keys disappear from the device entirely upon power off of the device and upon reset of the device.

15. The device-implemented method of claim 11, wherein the device is configured to prohibit transfer of the internal key in any form to outside of the device.

16. The device-implemented method of claim 11, wherein the device is configured as a Key per IO device.

17. A device-implemented method for crypto-erase, the method comprising:
receiving, at a device configured to perform data operations on a storage medium of a storage device using Key per IO operation in which different entities use the same address space in the storage device, a request to cause crypto-erasure of all data in at least one logical block address range of the storage medium,
individual portions of the data in the at least one logical block address range each being associated with a unique external key corresponding to one of the entities, the individual portions of the data each being encrypted using a unique media encryption key created using an internal key and the unique external key associated with the portion of the data; and
achieving the crypto-erase by destroying the internal key and all media encryption key(s) associated therewith in the device.

18. The device-implemented method of claim 17, wherein the external keys and the media encryption keys are only stored, in the device, in volatile memory.

19. The device-implemented method of claim 17, wherein the device is configured to prohibit transfer of the internal key in any form to outside of the device.

20. A system, comprising:
a device configured to perform data operations on a storage medium, the device having a processor and logic integrated with the processor, executable by the processor, or integrated with and executable by the processor, the logic being configured to cause the device to perform the method of claim 17.

* * * * *